Aug. 5, 1930.  J. CRITES  1,772,278
PULVERIZED MATERIAL TRANSPORTING DEVICE
Filed June 11, 1927
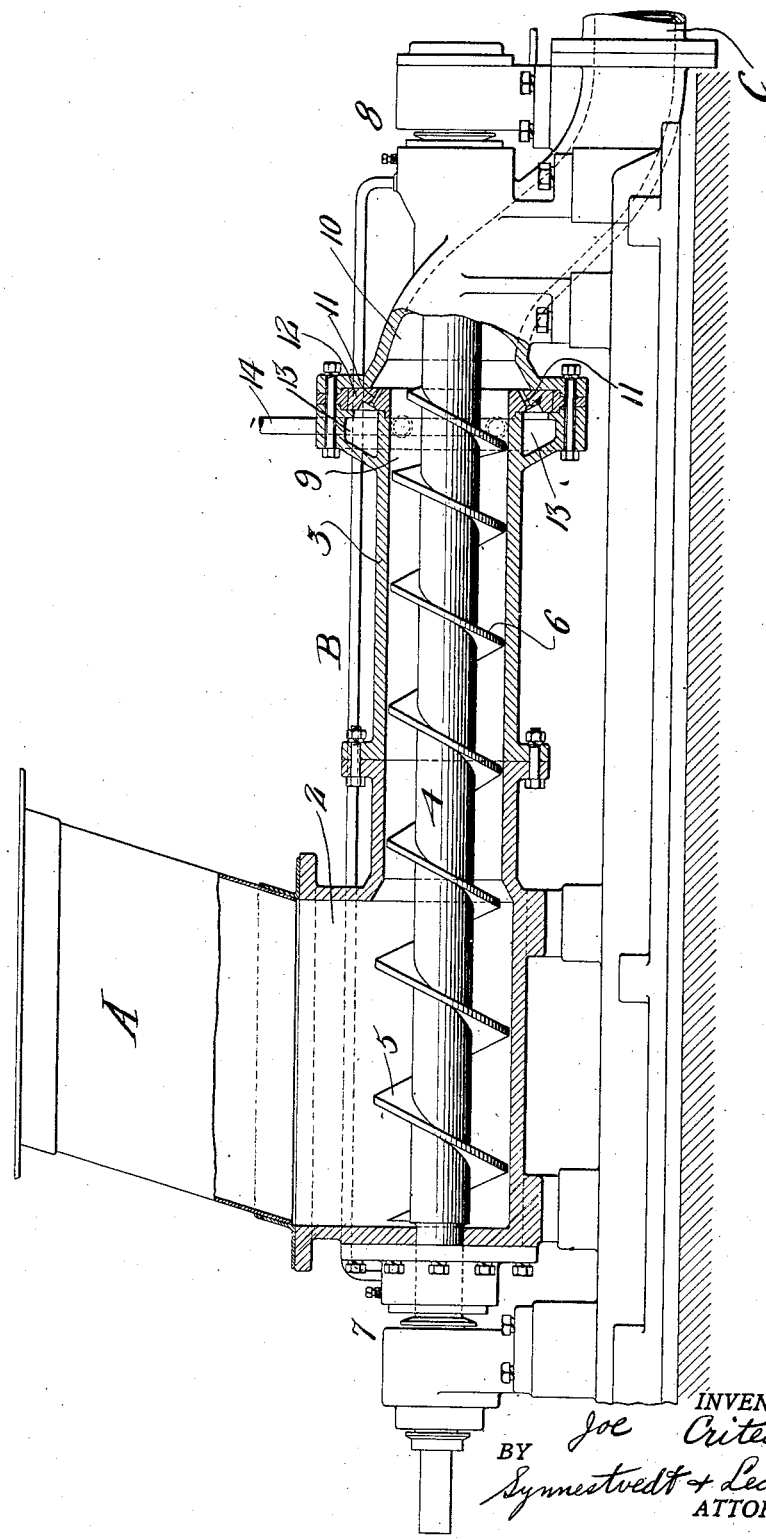
INVENTOR
Joe Crites
BY
Synnestvedt + Lechner
ATTORNEYS Patented Aug. 5, 1930

1,772,278

UNITED STATES PATENT OFFICE

JOE CRITES, OF EVANSTON, ILLINOIS, ASSIGNOR TO INTERNATIONAL COMBUSTION ENGINEERING CORPORATION, OF NEW YORK, N. Y., A CORPORATION OF DELAWARE

PULVERIZED-MATERIAL-TRANSPORTING DEVICE

Application filed June 11, 1927. Serial No. 198,040.

This invention relates to apparatus for transporting finely divided material and is especially useful in connection with the transport of pulverized coal from one point to another, as from a preparing plant to a storage bin. The invention is particularly concerned with that class of transporting apparatus in which the coal is advanced from a suitable source of supply by means of a feed screw to a sphere of pneumatic action in a transport line.

It is important in apparatus of this class to prevent back flow of the pressure fluid through the screw to the source of supply. I am aware that it has heretofore been proposed to provide devices in which "back flow" is prevented, but such devices, in most instances, are either complicated in structure, or are of such nature as to require excessive power to drive the screw.

The primary object of my invention is to provide a coal feeding device of simple construction in which back flow of the pressure fluid is effectually prevented, and one which is economical in power consumption and not subject to rapid wear.

How the foregoing, together with such other objects and advantages as may hereinafter appear, or are incident to my invention, are realized is illustrated in preferred form in the accompanying drawing, wherein:

The figure is a cross section through a device embodying my invention, certain of the parts appearing in elevation.

Referring to the drawing, the reference letter A denotes a portion of a bin or other storage receptacle for the material to be transported. The invention will be described in connection with the transportation of powdered coal, which coal is to be advanced by means of a feed device B to a transport line or conveyor pipe C and through the transport line to some distant point by means of compressed air.

The feed device B is located intermediate the discharge throat of the bin A and the conveyor pipe C, and comprises, in general, a casing having a hopper-like material receiving portion 2 and a barrel portion 3; and a feed screw 4 for delivering coal from the hopper portion 2 through the barrel portion 3 to the pipe or conduit C.

I propose to prevent the "back flow" above referred to by means of the novel construction of the feed screw 4 and by the particular disposition thereof with respect to the hopper like portion 2 and the barrel portion 3 of the casing.

The screw which I employ is of two diameters, the larger diameter 5 of which lies in the hopper portion 2 and the smaller diameter 6 of which lies in the barrel portion 3. Bearings 7 and 8 located at any convenient point are provided for the screw 4. The screw may be rotated by means of any suitable form of driving device not shown.

Upon inspection of the drawing, it will be seen that the larger diametered portion 5 ends in advance of the barrel 3 and that from this point the screw merges from large to small diameter, so that only the smaller diametered portion of the screw lies within the barrel. That this is advantageous will be understood from the following.

Under normal or regular operating conditions the flights of the screw would not be filled if a screw of the same diameter throughout were employed, because these transport screws are operated at relatively high speeds and owing to the centrifugal action a certain amount of the coal is rejected. By making the leading part of the screw of larger diameter, I ensure that the flights of that part of the screw in the barrel are completely filled, thereby preventing blow back.

Under other conditions, as, for example, when there is a large head of coal above the larger diametered portion of the screw, the screw will not reject coal and there would be a tendency to crowd too much coal into the barrel, which would involve increase in power consumption. However, by constructing the screw as above mentioned, that is, by having the screw merge from large to small diameter at the point mentioned above, I avoid such crowding of the material because any excess material which tries to enter the smaller diametered portion of the screw is rejected by the entrance edge of the barrel portion 3. It is to be understood that in some instances it may be desirable to have the larger diametered portion of the screw extend a short distance into the barrel, in which case only a small amount of excess material would enter the barrel, and, consequently, the increase in power requirements would be slight.

In short, the action of the feed screw is as follows: Coal from the bin A enters the flights of the screw 4 and is advanced by the threads of larger diameter to the threads of smaller diameter, the difference in diameters being such that the flights of the screw in the barrel will be filled with coal. Any coal in excess of that required to fill these flights is rejected as above pointed out. Owing to the coal being thus forced, so to speak, into the barrel, it will be seen that the coal in the barrel will not be thrown to the periphery of the barrel by centrifugal force, and, consequently, there will be no opening around the core of the screw through which the compressed transporting air could back flow.

In some instances, it may be desirable to decrease the pitch of the threads within the barrel toward the discharge end as indicated at 9 in the drawing to further ensure against the objectionable "back flow" hereinbefore mentioned.

The coal thus advanced discharges from the barrel into a discharge fitting 10, which is connected with the transport line C. This enables me to provide a suitable bearing for the screw at the discharge end of the device.

The compressed air for transporting the coal through the transport line is preferably admitted in close proximity to the discharge end of the screw through a plurality of apertures 11 in the ring 12. These apertures are in communication with the annular air chamber 13 to which air under pressure is supplied by means of the pipe 14. Air so introduced carries the coal through the line to the desired point.

From the foregoing it will be seen that I have provided a simple transporting device in which a minimum of power is required, in which rapid wear is eliminated, and in which back flow of the air is prevented in an effective manner.

I claim:—

1. A finely divided material transporting device comprising a casing having a hopper-like material receiving portion and a barrel portion, a rotatable feed screw having two zones one of one uniform diameter and the other of larger diameter, the zone of larger diameter of which lies in said hopper portion and the zone of smaller diameter of which lies in said barrel portion, a transport line, and means for supplying pressure fluid for transporting the material through said line, said fluid being admitted adjacent the discharge end of the feed screw.

2. A finely divided material transporting device comprising a casing having a hopper-like portion for receiving material to be transported and a barrel portion through which the material is advanced; a transport line through which the advanced material is to be transported, said line having connection with said barrel portion; a two diametered screw for advancing the material from the hopper portion to the transport line, the smaller diametered portion of which is of uniform diameter throughout its length and lies in said barrel and receives material advanced by the larger diametered portion of the screw; and means for admitting pressure fluid into said line for transporting the material therethrough.

3. A finely divided material transporting device comprising a casing having a hopper-like material receiving portion and a barrel portion extending from the hopper portion, a feed screw rotatably mounted in said casing having a portion of one uniform diameter adapted to receive material from said hopper portion and a portion of uniform diameter throughout its length and less than the diameter of said first portion for advancing material through the barrel and adapted to receive material advanced by the larger portion, the diameter of the second portion of the screw being sufficiently less than the diameter of first portion so as to keep the flights of the second portion of the screw filled with material, a discharge line for receiving the material advanced through the barrel, and means for introducing pressure fluid to said line for transporting the material therethrough.

4. A finely divided material transporting device comprising a casing having a hopper-like material receiving portion and a barrel portion extending from the hopper portion, a feed screw rotatably mounted in said casing having a portion of one uniform diameter adapted to receive material from said hopper portion and a portion of uniform diameter throughout its length and less than the diameter of said first portion for advancing material through the barrel and adapted to receive material advanced by the larger portion, said screw merging from the larger to the smaller diameter at a point in advance of the barrel portion, and the diameter of the first portion being sufficiently greater than the diameter of the second portion as to keep the flights of the second portion of the screw filled with material, a discharge line for receiving the material advanced through the barrel, and means for introducing pressure fluid to said line for transporting the material therethrough.

5. A finely divided material transporting device comprising a casing having a hopper-like material receiving portion and a barrel portion, a two diameter feed screw rotatably mounted in said casing, the larger and smaller diametered portions of which are uniform throughout the extent of said portions and being so disposed with relation to one another and to the hopper-like and barrel portions of the casing that material in excess of that required to fill the flights of the smaller diametered portion is prevented from entering said flights by the barrel, said portions of the screw being of such relative diameters however as to ensure filling of the flights of the smaller diametered portion, a transport line into which the material is discharged from said barrel, and means for introducing air to said line for transporting the material therethrough.

6. A finely divided material transporting device comprising a casing having a hopper-like material receiving portion and a barrel portion, a pulverized material bin associated with said hopper portion, a two diametered screw rotatably mounted in said casing, the larger diameter of which lies in the hopper portion and the smaller diameter of which lies in the barrel portion and the pitch of the screw decreasing toward the discharge end of the screw, a transport line into which the screw discharges, and means adjacent the point of said discharge for admitting pressure fluid into said line.

In testimony whereof I have hereunto signed my name.

JOE CRITES.